(12) United States Patent
Libault

(10) Patent No.: US 10,505,422 B2
(45) Date of Patent: Dec. 10, 2019

(54) AXIAL FLOW ELECTRIC MOTOR WITH CONDUCTOR LAYERS ON STATOR ARRANGED IN SEMI-PHASES PRINTED ON A PAIR OF CONDUCTIVE LAYERS

(71) Applicant: David Libault, Paris (FR)

(72) Inventor: David Libault, Paris (FR)

(73) Assignee: ELECTRICMOOD, Montreuil (FR)

( * ) Notice: Subject to any disclaimer, the term of this patent is extended or adjusted under 35 U.S.C. 154(b) by 1103 days.

(21) Appl. No.: 14/416,126

(22) PCT Filed: Jul. 23, 2013

(86) PCT No.: PCT/FR2013/000202
§ 371 (c)(1),
(2) Date: Jan. 21, 2015

(87) PCT Pub. No.: WO2014/016476
PCT Pub. Date: Jan. 30, 2014

(65) Prior Publication Data
US 2015/0214801 A1 Jul. 30, 2015

(30) Foreign Application Priority Data

Jul. 27, 2012 (FR) ..................................... 12 02121

(51) Int. Cl.
*H02K 3/28* (2006.01)
*H02K 21/24* (2006.01)
(Continued)

(52) U.S. Cl.
CPC ............ *H02K 3/28* (2013.01); *B60L 15/2054* (2013.01); *B60L 50/51* (2019.02); *B60L 58/21* (2019.02);
(Continued)

(58) Field of Classification Search
CPC ............ H02K 3/28; H02K 3/46; H02K 1/182; H02K 1/2793; H02K 21/24; H02K 3/26; H02K 2203/03; B60L 58/21; B60L 2240/421; Y02T 10/641; Y02T 10/645; Y02T 10/7005; Y02T 10/7061; Y02T 10/72; Y02T 10/7275
USPC .......... 310/198, 49.22, 49.23, 49.32, DIG. 6, 310/12.01–12.33, 15, 25, 28; 360/99.02, 360/99.23
See application file for complete search history.

(56) References Cited

U.S. PATENT DOCUMENTS

| 405,858 A | 6/1889 | Tesla |
| 2,970,238 A * | 1/1961 | Swiggett ................. H02K 3/26 226/188 |

(Continued)

FOREIGN PATENT DOCUMENTS

| FR | 1 520 439 A | 4/1968 |
| WO | 2004/073365 A2 | 8/2004 |

OTHER PUBLICATIONS

14416126—549682—EICSEARCH EIC STIC Search.*
International Search Report, dated Sep. 26, 2013, from corresponding PCT application.

*Primary Examiner* — Mang Tin Bik Lian
*Assistant Examiner* — Maged M Almawri
(74) *Attorney, Agent, or Firm* — Young & Thompson

(57) ABSTRACT

A 2p poles axial-flow electric motor includes a stator composed of at least one pair of conductor layers on which the printed phases are arranged in semi-phases.

15 Claims, 17 Drawing Sheets

(51) Int. Cl.
*H02K 1/27* (2006.01)
*H02K 3/26* (2006.01)
*B60L 15/20* (2006.01)
*B60L 50/51* (2019.01)
*B60L 58/21* (2019.01)

(52) U.S. Cl.
CPC ............. *H02K 1/2793* (2013.01); *H02K 3/26* (2013.01); *H02K 21/24* (2013.01); *B60L 2220/50* (2013.01); *B60L 2240/421* (2013.01); *Y02T 10/641* (2013.01); *Y02T 10/645* (2013.01); *Y02T 10/7005* (2013.01); *Y02T 10/7061* (2013.01); *Y02T 10/72* (2013.01); *Y02T 10/7275* (2013.01)

(56) References Cited

U.S. PATENT DOCUMENTS

| | | | | |
|---|---|---|---|---|
| 3,223,868 A * | 12/1965 | Henry-Baudot | ......... | H02K 3/26 310/185 |
| 3,450,919 A | 6/1969 | Henry | | |
| 4,115,915 A * | 9/1978 | Godfrey | ................... | H02K 3/12 29/596 |
| 4,645,961 A * | 2/1987 | Malsky | ................... | H02K 1/278 310/156.07 |
| 2006/0055265 A1* | 3/2006 | Zalusky | ................... | H02K 3/26 310/156.32 |
| 2006/0202584 A1* | 9/2006 | Jore | ....................... | H02K 21/24 310/179 |
| 2011/0037354 A1* | 2/2011 | Yan | .......................... | H02K 3/26 310/68 B |
| 2011/0273048 A1* | 11/2011 | Jore | ....................... | H02K 1/12 310/156.37 |
| 2012/0126927 A1* | 5/2012 | Iwaya | ...................... | H02K 3/26 336/200 |
| 2012/0133474 A1* | 5/2012 | Iwaya | ...................... | H02K 3/26 336/200 |
| 2012/0181886 A1* | 7/2012 | Osada | ...................... | H02K 3/14 310/71 |
| 2015/0146322 A1* | 5/2015 | Bi | ...................... | G11B 19/2009 360/99.08 |

* cited by examiner

AXIAL FLOW ELECTRIC MOTOR WITH CONDUCTOR LAYERS ON STATOR ARRANGED IN SEMI-PHASES PRINTED ON A PAIR OF CONDUCTIVE LAYERS

The present invention relates to an axial-flow electric motor.

An electric motor is a device which transforms electrical power into mechanical power. The description will be limited to rotating machines. Those skilled in the art could easily transpose the invention to linear machines.

An electric motor is composed of two parts: a rotating part called a rotor and a fixed part called a stator. It is the torque developed between the stator and the rotor which causes rotation of the rotor and provides mechanical power to the driven device.

Electric motors have many applications in industry and in public products such as a washing machine or a quartz watch. One of these applications is propulsion of electric vehicles.

FIG. 1 shows a diagram of an electric vehicle in which the electric energy is supplied by a battery 16 of lithium/ion/polymer type, for example. So-called control electronics 10 are connected to power electronics 11, in turn connected to an electric motor 12. The electric motor 12 transmits its mechanical power to a motorised wheel 13 by means of a transmission 14. This transmission can be realised by means of a motor shaft, a chain or a transmission belt. A gearbox can be interposed between the motor and the transmission.

In the case of a brushless motor, the control electronics 10 adapt the phase of the current injected into the motor 12 so that it is locked onto the rotation phase of the rotary magnetic field created by the rotor. An optical position sensor 15, or Hall effect sensor for example, connected to the control electronics 10 can be used to measure the angle of rotation of the rotor relative to the stator, this measurement being integrated into the control loop.

Those skilled in the art know that there are many possible combinations of one or more batteries, one or more electric motors with one or more transmissions and one more motorised wheels for producing such a device.

In some cases the transmission can be omitted by integrating the electric motor 22 into the motorised wheel as illustrated in FIG. 2. In this case, the wheel is attached to the rotor of the motor. This device eliminates mechanicals losses and the replacement cost of wearing pieces of a transmission system.

The history of electric motors reveals that the first machines were axial flow (U.S. Pat. No. 405,858 N. Tesla, 1889). This type of motor was then exploited to the benefit of the radial flow motor until recent development of high-energy magnets such as magnets of NdFeB type called «rare earth» (first publication in 1983) which revived interest in this type of machine.

The characteristic of the axial flow motor is that the direction of the magnetic field is parallel to the axis of rotation of the motor. The conductors through which electric current travels are arranged radially.

FIG. 3 shows a schematic section of an axial flow motor 30 and permanent magnets (AFPM for Axial Flux Permanent Magnet) in a configuration integrated into the wheel. The rotor integrates permanent magnets 31 whereof magnetisation and arrangement create an alternative magnetic field in the axial direction. The direction of magnetisation alternates between two successive poles. The number of times when the direction of magnetisation is reversed during a complete rotation of the rotor is called number of poles. Since this number is a pair, it is said that the motor has 2p poles, p being a whole number greater than zero.

The stator is constituted by windings 32 letting the conductors 33 traverse the gap formed by the rotor, and generate torque when they are traversed by electric current. The direction in which the electric current traverses the conductor in the gap relative to the orientation of the field magnetic field created by the magnets of the rotor 31 is essential for the torques generated by each segment of conductor to be added.

Several phases distributed evenly and angularly, activated alternatively produce constant torque irrespective of the angle of position of the rotor relative to the stator. The number of phases of the stator is designated by m. In the majority of cases, m=3. In the case of a three-phase stator, the latter can be assembled in a star or delta, the configuration in a star being the commonest.

Printed circuit technology can be used advantageously to make the stator of an axial-flow electric motor and permanent magnets.

A printed circuit comprises a stack of conductive and insulating layers alternatively. The material used as insulating substrate is generally a composite of epoxide resin reinforced with glass fibre. This substrate supplies the mechanical resistance necessary for supporting stresses generated by the resulting torque. The conductor used is generally a metal such as copper or aluminium.

FIG. 4 shows a schematic section of a two-layer printed circuit 40.

The conductive layers 41 on the insulating substrate are etched by chemical photoetching to reproduce the preferred patterns. Metallised holes 43 make electric contacts between patterns of two or more conductive layers of the same printed circuit. An insulating varnish 44 is applied on completion of the manufacturing process.

FIG. 5 shows an example of a four-layer printed circuit 50. In the case of multi-layer printed circuits, in addition to the external conductive layers 55, internal conductive layers 51 are added by alternating them with layers of insulating substrate 52. Different assembly configurations are possible. In the configuration shown, the metallised holes can be through-holes 53, that is, they potentially place all the traversed layers in contact, either blind 54 that is, the holes traverse only one layer of substrate 52, and only two adjacent conductive layers can be connected at this point. The interest in blind metallised holes is obtaining several points of connection isolated from one another at the same coordinates.

The printed circuit industry currently produces circuits of 2 to 12 layers. The thickness of the layers of conductor used currently varies from 35 micrometers to 140 micrometers. Photoetching technology produces minimal spacing between the tracks, of the order of tens of microns.

The majority of printed circuits produced by the electronics industry is used for assembling discrete electronic components (resistors, condensers, inductors, transistors etc. . . . ) and integrated components (processors, memories, power management circuits etc. . . . ) surface-mounted or traversing.

For this application, the total thickness of the necessary circuit is minimal, of the order of 3 millimeters at most. Consequently, the majority of manufacturing equipment of printed circuits is designed for manufacturing circuits of thickness less then 3 millimeters.

However, in the case of a stator of an axial-flow electric motor this thickness limit can limit the performance of the motor. In fact, for a given intensity of electric current, the less the thickness of the stator, the greater the density of current passing though it. When the density of electric current is excessive, the rise in temperature of the circuit by Joule effect can destroy the latter. If a thickness of the stator greater than 3 millimeters is necessary, the manufacturing equipment for printed circuits should be adapted, which would significantly raise tooling costs.

In this case, use can be made of assembling printed circuits of minimal thickness to produce a stator of greater thickness, as illustrated in FIG. 6. The difficulty of assembly is that the conductors have their point of access at the centre of the circuit. It is therefore not possible to connect the circuits 61, 62 to each other than by placing metallised holes 63 of adjacent circuits in the stack opposite. Contact between the circuits is then ensured by a conductive wire 64 placed in the metallised holes opposite the two circuits, as shown in FIG. 6. Contact between the conductive wire 64 and the metallised hole 63 can be made by welding or via a clamping system, for example.

The present invention aims to rectify at least one of these drawbacks.

For this purpose a first aspect of the invention relates to a magnetic $2p$ poles axial-flow electric motor comprising: a rotor; and a stator with m phases, the stator comprising at least one pair of conductor layers on which conductive tracks constituting the phases of the stator are arranged in semi-phases.

According to an embodiment each semi-phase comprises two sets of conductive tracks; each set of conductive tracks being arranged in a radial configuration between an internal edge of the stator and an external edge of the stator, such that the electric current of a set of conductive tracks of a semi-phase flows from the internal edge of the stator towards the external edge of the stator and the electric current of the other set of conductive tracks of said semi-phase flows from the external edge of the stator towards the internal edge of the stator.

Each set of conductive tracks can comprise one or more conductive tracks.

According to an embodiment one of the sets of conductive tracks of a semi-phase is printed on a layer of a pair of conductor layers and the other set of conductive tracks of said semi-phase is printed on the other layer of said pair of conductor layers.

According to an embodiment the two sets of conductive tracks of a semi-phase are interconnected by connections arranged near the internal and external edges of the stator.

According to an embodiment the two semi-phases of the same phase and of the same pair of conductor layers of the stator are offset relative to each other by rotation of angle $$\frac{\pi}{p}$$

radians.

According to an embodiment two access points of the electric current to the conductive tracks of a semi-phase of a pair of conductor layers of the stator, are offset relative to each other by rotation of angle $$\frac{2\pi}{p}$$

radians, each access point being associated with an end of said semi-phase.

According to an embodiment the access points of the electric current of a semi-phase are arranged on the same radius of the stator.

According to an embodiment each access point of the electric current of said semi-phase is offset by a given angle relative to the associated end.

According to an embodiment the access points of the electric current of a semi-phase are radially offset relative to the ends.

According to an embodiment the pairs of conductor layers of the stator are stacked on each other after rotation of 0 or $$\frac{2\pi}{p}$$

radians and connected together by the access points of the electric current to the semi-phases now opposite.

According to an embodiment the conductive tracks constituting the phases are assembled in a star, and the points of return are used for injection of the electric current into the stator.

In the following, the embodiments of the invention are described in reference to the attached figures in a known non-limiting manner, in which:

FIG. 1 schematically illustrates an example of use of an electric motor for the propulsion of a vehicle;

FIG. 2 schematically illustrates another example of use of an electric motor for the propulsion of a vehicle in which the motor is integrated into the motorised wheel;

FIG. 3 shows a schematic section of an example of an axial flow and permanent magnet motor;

FIG. 4 a schematic section of a two-layer printed circuit;

Figure 1:
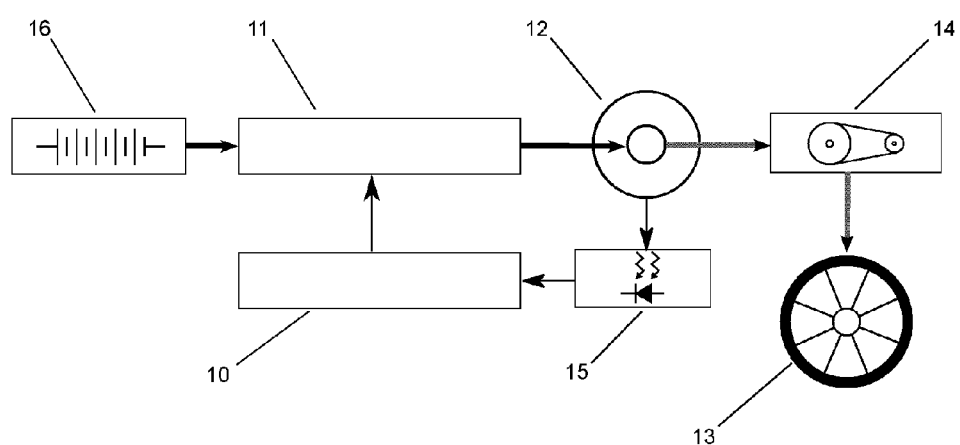
Figure 2:
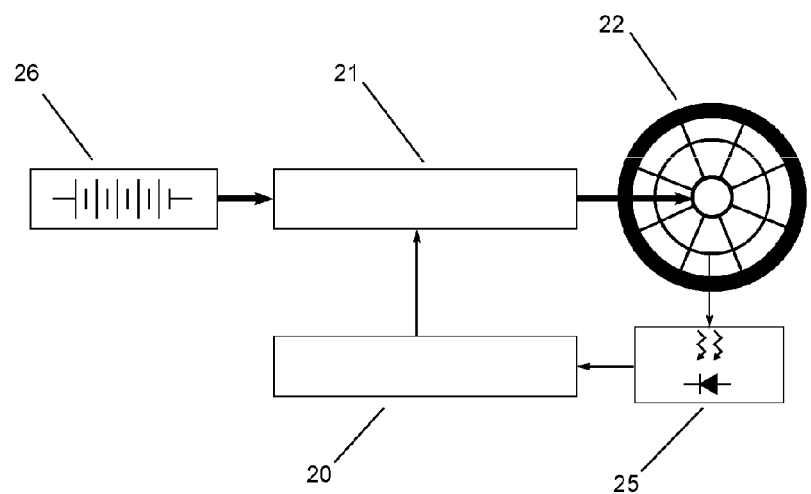
Figure 3:
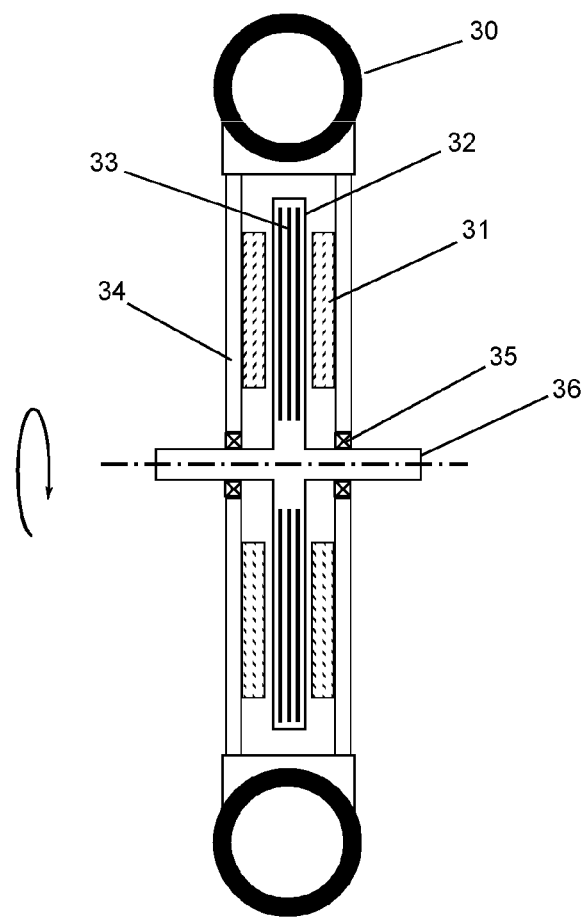
Figure 4:
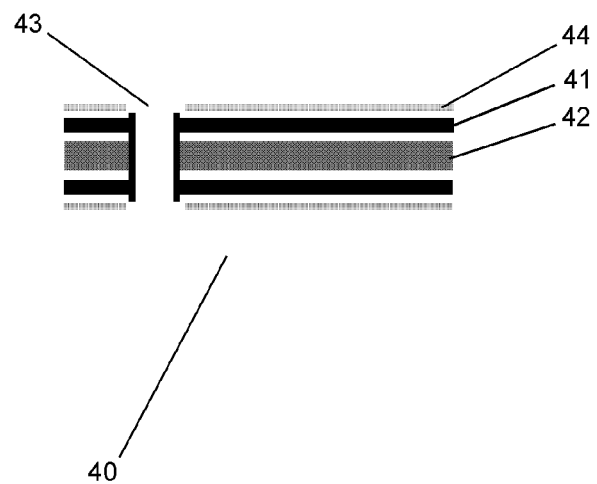
Figure 5:
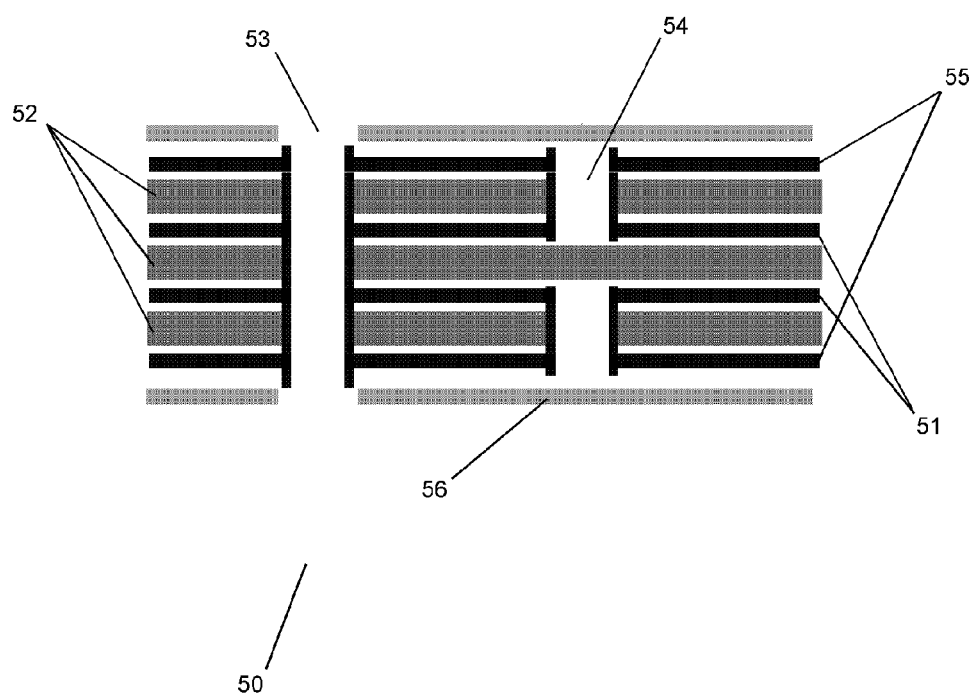
FIG. 5 shows a schematic section of a four-layer printed circuit.
Figure 6:
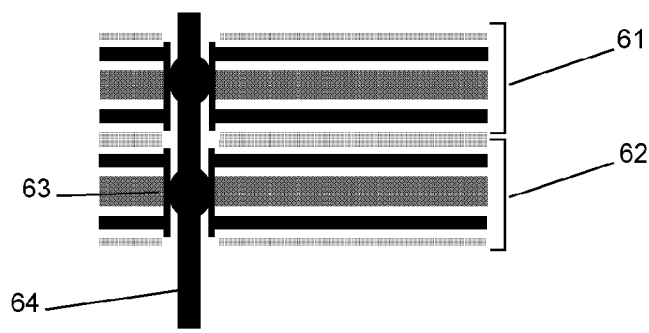
FIG. 6 shows a schematic section of the assembly of two two-layer printed circuits.
Figure 7:
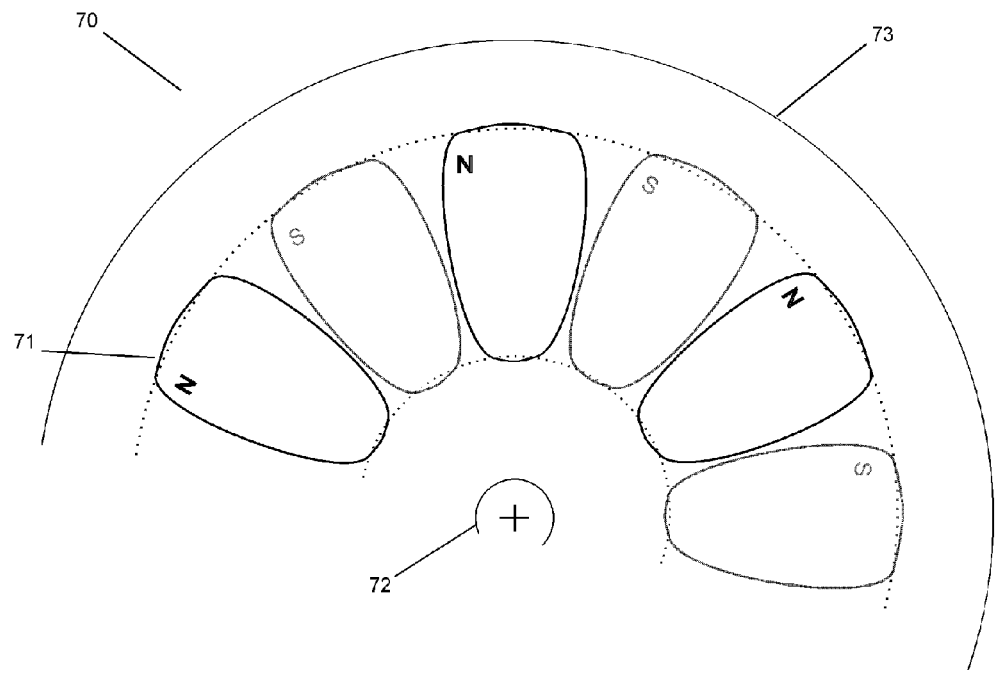
Figure 8:
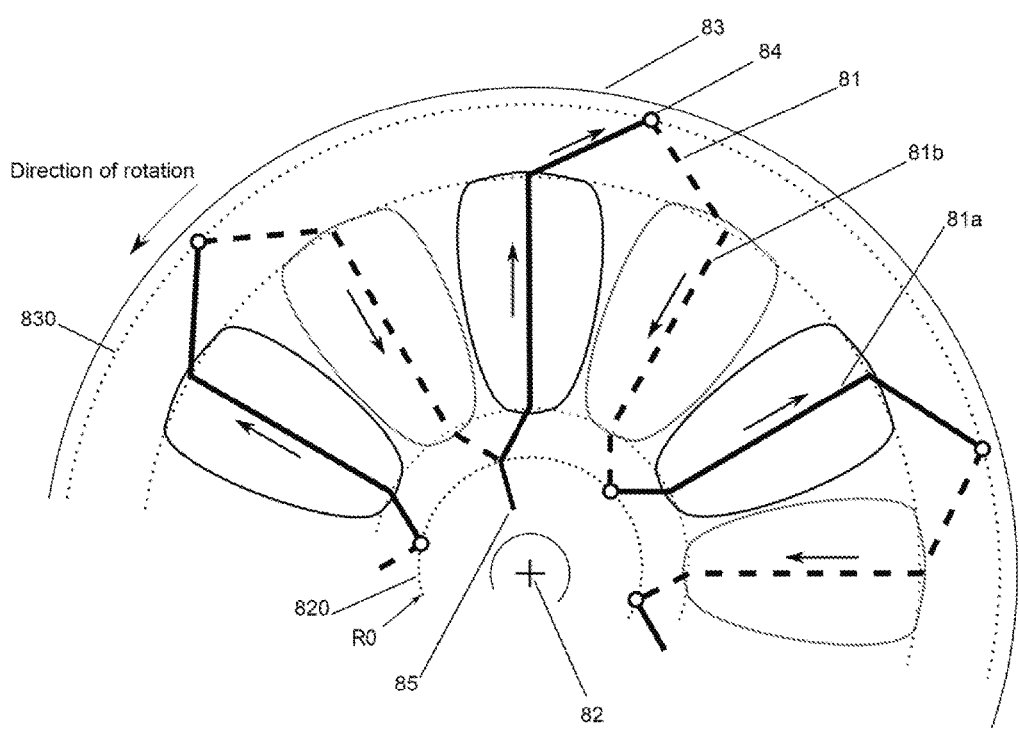
Figure 9:
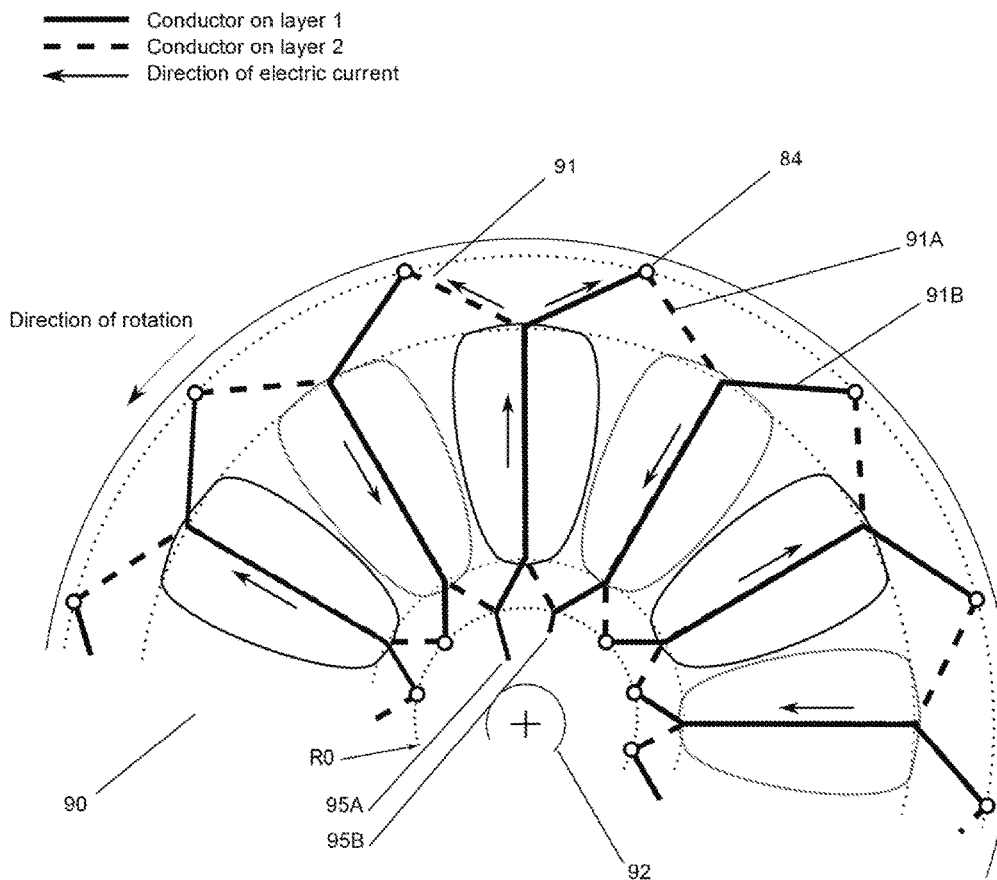
Figure 10:
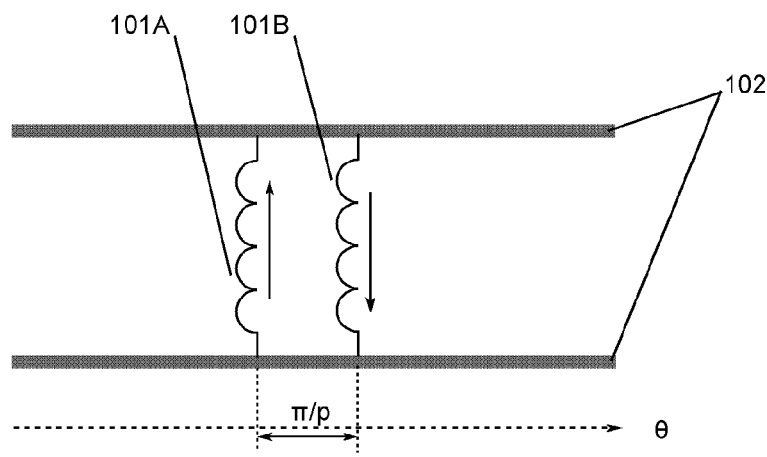
Figure 11A:
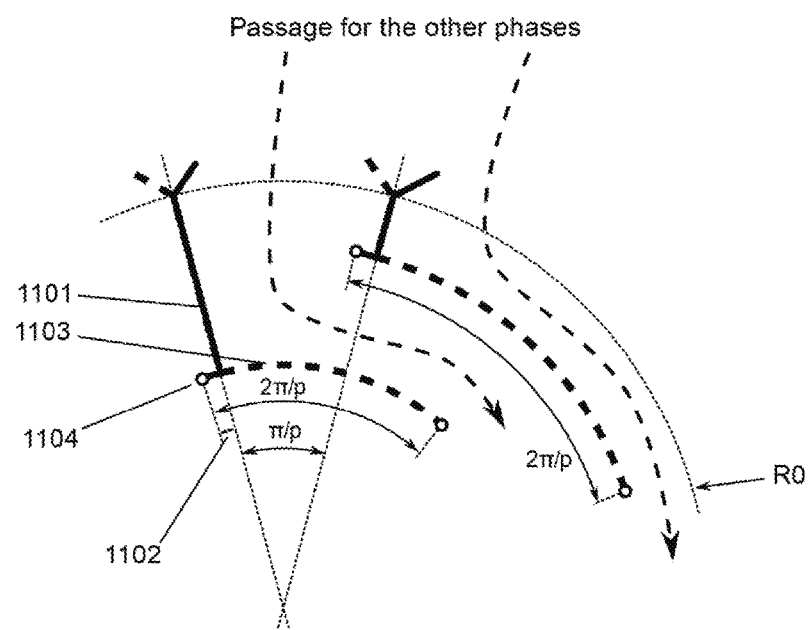
Figure 11B:
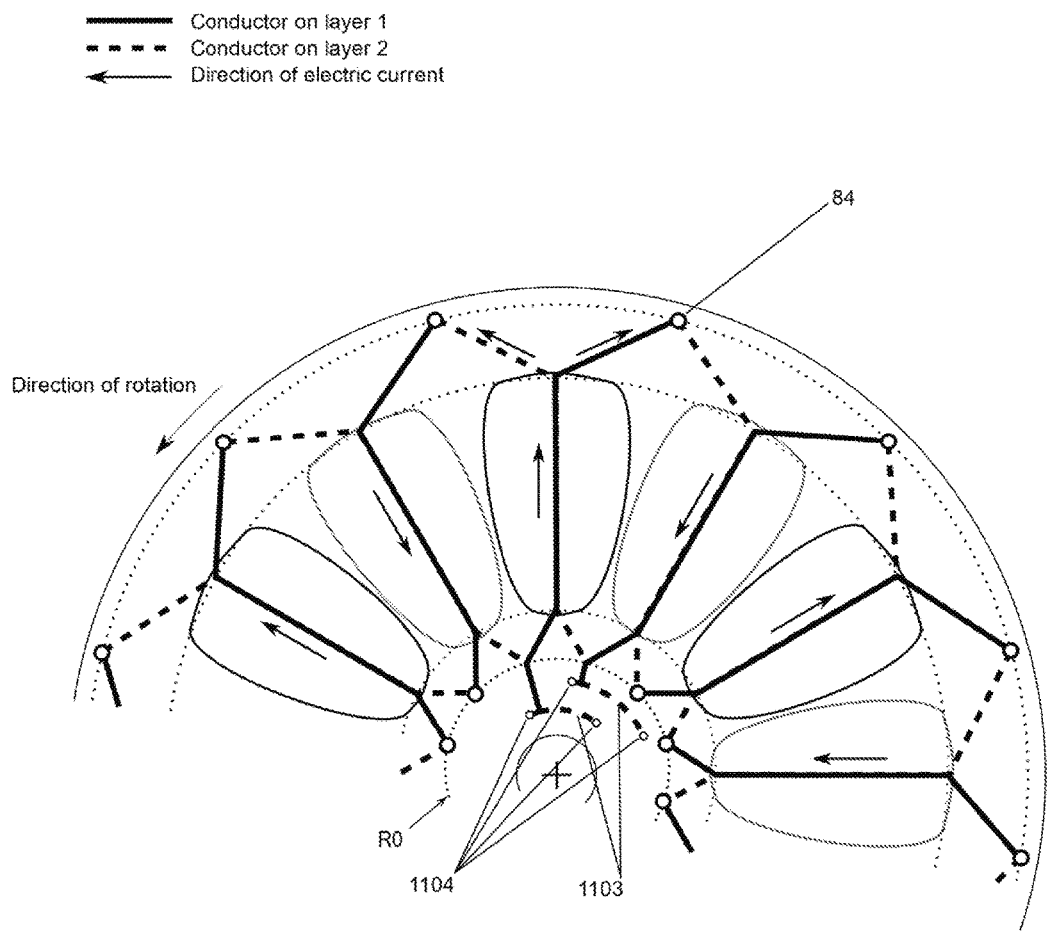
Figure 12:
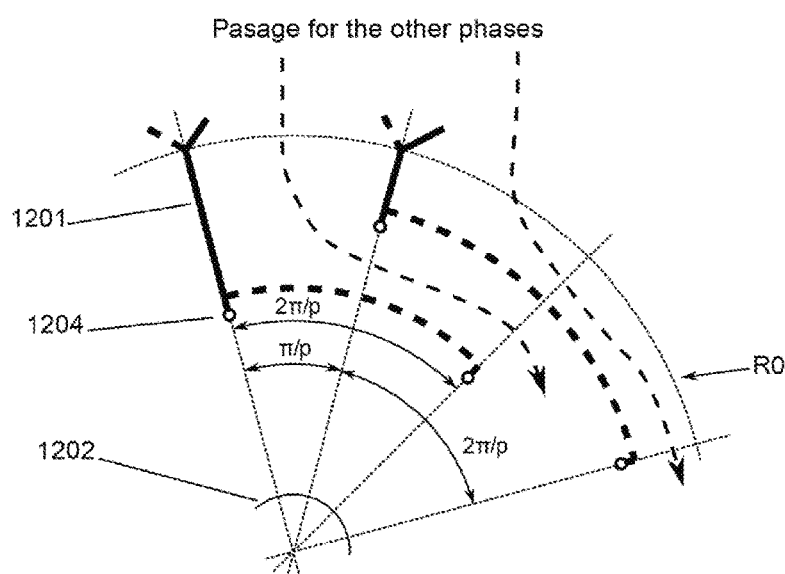
Figure 13:
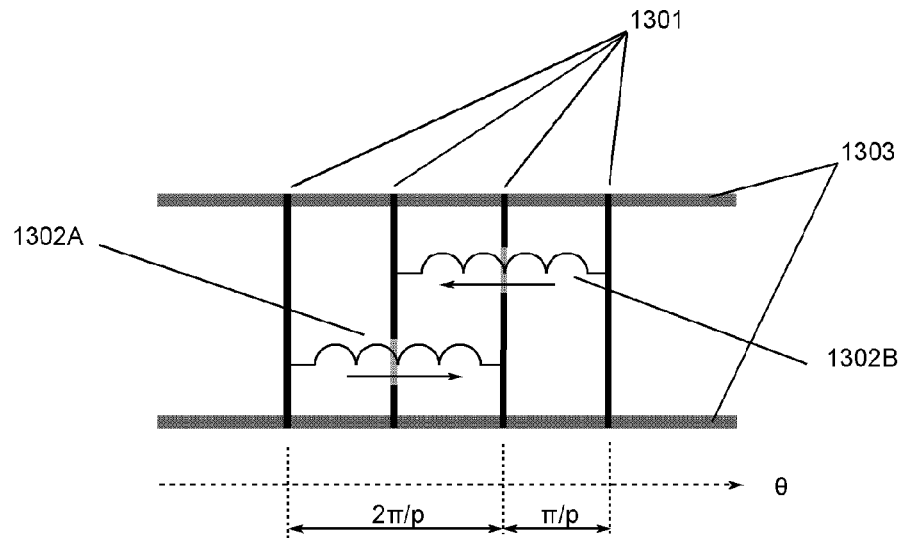
Figure 14:
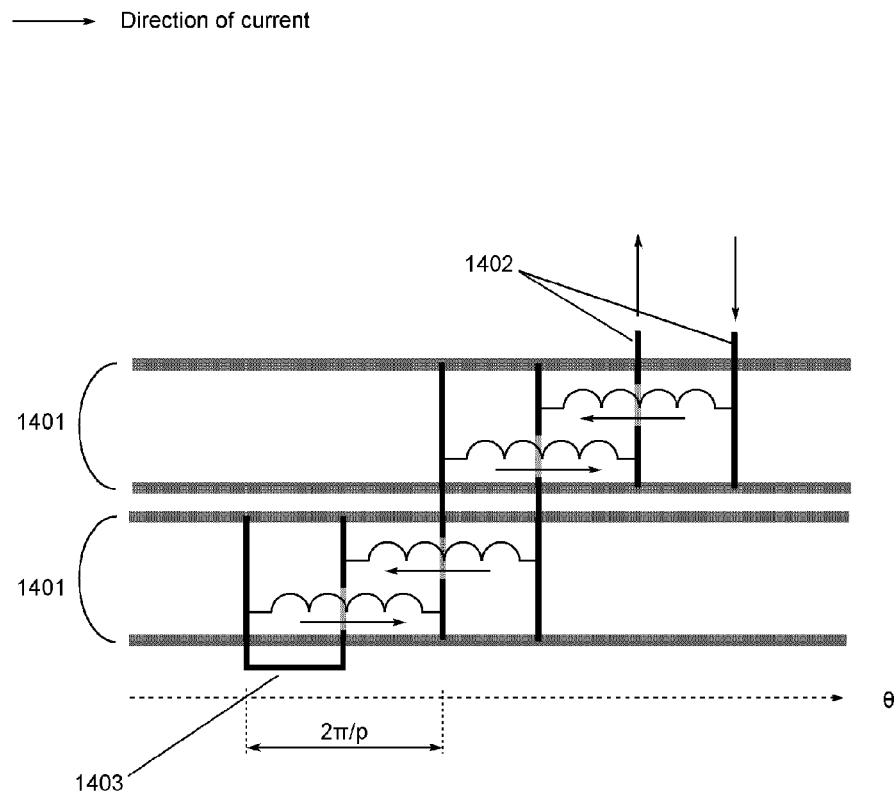
Figure 15:
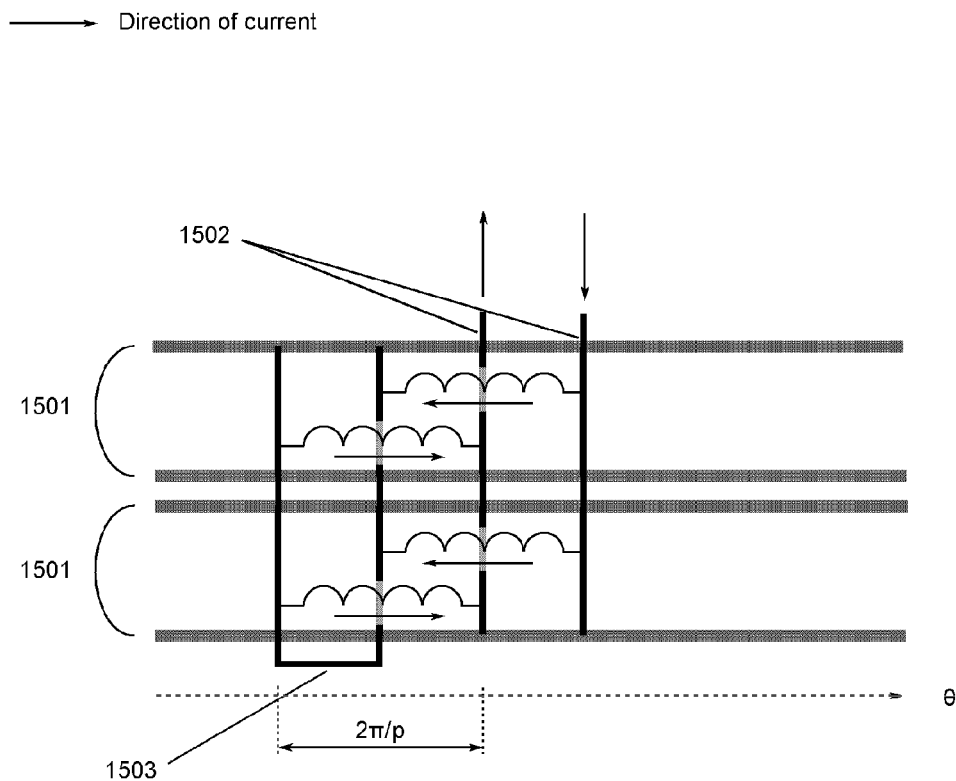
Figure 16:
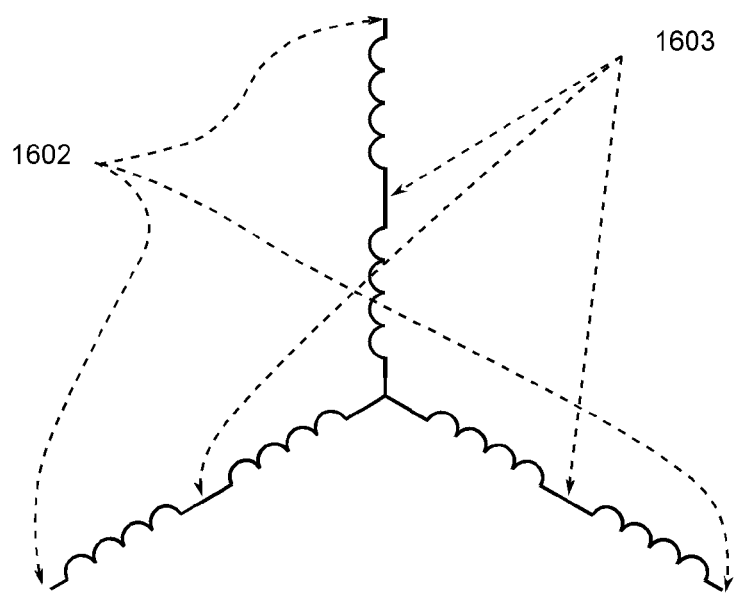

FIG. 7 schematically shows the arrangement of the magnetic poles attached to a rotor according to an embodiment of the invention;

FIG. 8 schematically shows an example of the arrangement of the conductive tracks constituting a semi-phase of a stator according to an embodiment of the invention;

FIG. 9 schematically shows an example of the arrangement of the conductive tracks constituting the two semi-phases of the same phase of a stator according to an embodiment of the invention;

FIG. 10 shows a diagram equivalent to that of FIG. 9;

FIG. 11*a* schematically shows the arrangement of the access points on the conductive tracks constituting the semi-phases of the same phase of a stator according to an embodiment of the invention;

FIG. 11*b* schematically shows the elements of FIG. 11*a* on the diagram of FIG. 9;

FIG. 12 schematically shows the arrangement access points to the conductive tracks constituting the semi-phases attached to a stator according to another embodiment of the invention;

FIG. 13 shows a diagram equivalent to FIGS. 11 and 12;

FIG. 14 shows a diagram equivalent of assembly of two circuits in series according to an embodiment of the invention;

FIG. 15 shows a diagram equivalent to assembly of two circuits in parallel according to an embodiment of the invention; and FIG. 16 shows a diagram equivalent to 3 phases of a stator connected according to an embodiment of the invention.

The embodiments of the invention are described in the context of a motor whereof the magnetic excitation field is generated by permanent magnets, as these give the best performances. However, those skilled in the art will recognise that the invention is applicable to others types of magnetic excitation.

To present embodiments of the invention, the arrangement of the poles of a rotor and windings of a stator of an electric motor for a phase of a stator will be described in reference to FIGS. 7 and 8. In the first embodiment described, the circuit electric of the motor is constituted by two conductive layers. These two conductive layers can be the two layers of a double-layer printed circuit or two of the layers of a multi-layer printed circuit connected by blind metallised holes.

FIG. 7 schematically shows the arrangement of the magnetic poles 71 attached to a rotor 70 of the axial-flow electric motor according to an example of at least one embodiment of the invention. The principal direction of magnetisation in this embodiment is axial. The magnetic poles 71 are arranged in a radial configuration between the internal edge 72 at the centre of the rotor 70 and the external edge 73 of the rotor 70. The internal edge 72 allows passage for the axle of the stator.

FIG. 8 schematically shows an example of the arrangement of the conductive tracks constituting semi-phases of a phase of a stator according to an embodiment of the invention. Each semi-phase of a phase of the stator comprises conductive tracks 81 describing out-and-back motions between the centre of the stator 82 and the exterior 83 of the stator. Two sets of conductive tracks 81 comprising a given semi-phase are etched on two different conductive layers. The set of conductive tracks 81a of a semi-phase performing away motion of the electric current from the centre 82 of the stator towards the exterior 83 of the stator is etched on one layer and the other set of conductive tracks 81b of the same semi-phase performing return motion of the electric current from the exterior 83 of the stator towards the centre 82 of the stator is etched on a different layer. The conductive tracks 81a and 81b are interconnected by means of metallised holes 84 arranged at the periphery 830 and on the inside 820 of the stator 80 on a radius of the centre of the stator noted R0. The metallised holes 84 comprise the intrinsic connections of the semi-phase. This configuration has several phases on the same pair of layers without causing short-circuit between them.

The geometric form of the conductive tracks 81 carrying out out-and-back motions can vary. U.S. Pat. No. 3,144,574 proposes especially several geometries which can be used in the context of the invention.

Access by electric current to the semi-phase is done by its ends at point 85 on the internal edge of the stator, as indicated in FIG. 8 on the two conductive layers.

A semi-phase 81 uses only half of the surface of available conductor on each layer. It is possible to use a second semi-phase obtained from the first by way of rotation of an angle by $$\frac{\pi}{p}$$

(p being the number of poles), as illustrated in FIG. 9. The conductive tracks of two semi-phases one of the same phases are separated by an angle of $$\frac{\pi}{p}.$$

The phases n and n+1 are separated by an angle of $$\frac{\pi}{mp}.$$

As a consequence all the semi-phases are almost identical to each other at an angle of rotation.

Each phase of the stator therefore comprises two semi-phases constituted by the conductive tracks 91 (91A and 91B). The terminations for each phase are available at the centre of the circuit between R0 and the internal edge 92 of the stator.

FIG. 10 shows the equivalent diagram of the circuit of FIG. 9. Each semi-phase is shown by an inductor 101A, 101B. The arrow under the inductor indicates the direction of the current giving positive torque. This diagram of FIG. 10 shows that the two semi-phases 101A, 101B are of opposite polarity. Only the angle $$\theta = \frac{\pi}{p}$$

of access points 95A and 95B to the two semi-phases of a phase of the stator is shown on the diagram. The radius can vary from R0 to the internal edge 92 of the stator.

By using a metallised hole for each access point of the electric current 95 of a semi-phase, two circuits can be assembled in parallel. A disadvantage of this assembly is that the greater the number of layers, the less the equivalent resistance of the assembly. This involves considerable supply currents, which can be prohibitive according to the preferred characteristics of the motor and of the power electronics.

To assemble two identical electric circuits in series, a particular embodiment of the invention consists of placing the metallised access holes of the electric current on the conductive tracks 1101 of the semi-phases, as illustrated in FIGS. 11a and 11b. The metallised access holes of the electric current 1104 on the semi-phases 1101 in this embodiment are arranged on the same radius of the centre of the stator and offset of $$\frac{2\pi}{p}$$

radians relative to each other. They are offset tangentially by an angle 1102 relative to the ends of the semi-phases to prevent the metallised access hole 1104 of the semi-phase 1101 from short-circuiting with the other end 1103 of the same semi-phase connected to the other access point of the electric current 1104. It is evident that it is possible to obtain the others phases of the stator by rotation of the phase shown without short-circuit between the phases by adapting the radius of the access points to the semi-phases for each semi-phase.

FIG. 12 schematically illustrates another embodiment of the invention in which the metallised holes 1204 of the access of the electric current to the conductive tracks of the semi-phases constituting a phase are offset in the radial direction and not in the tangential direction. According to the space between R0 and the internal edge 1202 of the stator, the width of the conductive tracks 1201, and the width of the interconnection conductive tracks, one or the other of the two embodiments will be better adapted. Of course it is also possible to shift the metallised holes 1204 in a direction, a combination of the tangential and radial direction.

In the case where pairs of conductive layers should be stacked inside the same printed circuit, the metallised holes at the periphery and on R0 constituting the intrinsic multi-layer interconnections of the semi-phases would be blind holes. Only the metallised access holes to the semi-phases would be through-holes.

FIG. 13 shows a diagram equivalent to the circuits shown in FIGS. 11 and 12. The semi-phases 1302A and 1302B are shown between the two layers of conductor 1303, and the metallised access holes to the semi-phases 1301. Only the angle θ of the position of the metallised holes 1301 is shown.

FIG. 14 shows the equivalent diagram of two circuits 1401 described in FIG. 13 in series. This diagram can represent the assembly of two circuits double layer or four of the layers of a multi-layer circuit. Rotation by an angle of $$\frac{2\pi}{p}$$

radians of one circuit relative to the other places the metallised holes of access opposite the electric current of the semi-phases such that the latter are connected in series, and the direction of the electric current circulating in each semi-phase lets the torques generated by each semi-phase be added, the arrangements of the tracks of the semi-phases and the poles of the stator being unvarying by rotation of $$\frac{2\pi}{p}$$

radians. The metallised holes 1402 let the current enter and exit the set of semi-phases of the two circuits 1401 which constitute a complete phase of the stator. The metallised holes 1402 are called the access points of the phase shown. The point of return 1403 connects the semi-phases together and in this way closes the current loop.

In the case of assembly of two printed circuits, this arrangement therefore allows assembly in series of identical circuits. Tooling costs for manufacturing and logistics are limited.

FIG. 15 shows the connection in parallel of two circuits 1501 such as described in FIG. 13 according to an embodiment of the invention. The circuits 1501 undergo no rotation relative to each other, and the set of access points to the semi-phases of one of the circuits 1501 is connected to its equivalent of the other circuit 1501. Similarly as in FIG. 14, the points 1502 are the access points in the phase shown, and the point of return 1503 connects the semi-phases together and in this way closes the current loop.

When a new circuit is added to the stack it can be in series or in parallel according to whether rotation of $$\frac{2\pi}{p}$$

relative to the preceding circuit is carried out or not. In the case of assembly of printed circuits, it is possible to obtain different electric configurations with a single type of printed circuit.

FIG. 16 shows an equivalent diagram of 3 phases of a stator assembled according to an embodiment of the invention described, then in a star. The point of return 1603 shown in FIGS. 14 and 15 is indicated on this diagram for each of the phases. The points of return 1603 are accessible at the centre of the stator on the face opposite the face on which the access points to the phases 1602 are accessible. For each phase, on the two access points shown in FIGS. 14 (1402) and 15 (1502) a single one remains available, the other being used for connection of the phases together in a star.

If the current is injected at the points of return instead of the access points to the phases, and if the latter are left in open circuit, then only half the windings is used. In this case, the counter-electromotor force for a given speed of rotation is divided by two. This device therefore implements a double-winding dual-speed system. When the rotation speed is low, the current is injected at the access points to the phases. In this case the torque per ampere of current injected will be the greatest. When the rotation speed is high, the current is injected at the points of return, the access points to the phases being left in open circuit. In this case, the counter-electromotor force is divided by two.

In the proposed description, each semi-phase passes through a pole once only to simplify description. In reality, each semi-phase can describe several turns of the stator instead of a single one, as described. Since this other configuration does not change the arrangements of the access points to the semi-phases, it has no influence on the subject of the invention.

As is obvious, and as also results from the above, the invention is not limited to the particular embodiments just described and instead encompasses all variants.

The invention claimed is:

1. A magnetic plural pole (2p) axial-flow electric motor comprising:
   a rotor; and
   a stator with m phases comprising at least one pair of conductor layers on which conductive tracks constituting the phases of the stator are arranged in semi-phases,
   the conductive tracks including current access points, each of the current access points directly connecting the conductive tracks of a corresponding phase of the stator to a source of input current to thereby provide electric current access, for current input from and return to the source of input current, to the conductive tracks of each semi-phase, the current access points being located at an inside end of each semi-phase on an internal edge of the stator,
   wherein the current access points are arranged on a same radius of the stator,
   wherein two of the current access points of the electric current to the conductive tracks of an individual semi-phase of the at least one pair of conductor layers of the stator are offset relative to each other by a rotation angle,
   wherein intrinsic connections connect the semi-phases of each phase together, and wherein the plural pole (2p) axial-flow electric motor has 2p poles, p being a whole number greater than zero.

2. The magnetic plural pole (2p) axial-flow electric motor according to claim 1 wherein the current access points of the electric current of a semi-phase are radially offset relative to the ends.

3. The magnetic plural pole (2p) axial-flow electric motor according to claim 1, wherein,
the conductive tracks arranged in semi-phases and constituting the m phases of the stator are printed layers located on at least a first pair of conductor layers and on a second pair of conductor layers,
the conductive tracks arranged on the first pair of conductor layers defining a first printed electric circuit,
the conductive tracks arranged on the second pair of conductor layers defining a second printed electric circuit identical to the first printed electric circuit,
the first and second printed electric circuits being connected in series, $$\frac{2\pi}{p}$$

4. The magnetic plural pole (2p) axial-flow electric motor according to claim 1 wherein each current access point of the electric current of said semi-phase is offset by a given angle relative to the associated end.

5. The magnetic plural pole (2p) axial-flow electric motor according to claim 1 wherein the current access points of the electric current of a semi-phase are radially offset relative to the ends.

6. The magnetic plural pole (2p) axial-flow electric motor according to claim 1 wherein the two semi-phases of the same phase and of the same pair of conductor layers of the stator are offset relative to each other by the rotation angle of $$\frac{\pi}{p}$$

radians, where n is the mathematical constant pi and p is the number of poles (p).

7. The magnetic plural pole (2p) axial-flow electric motor according to claim 6 wherein the pairs of conductor layers of the stator are stacked on each other after rotation by 0 or $$\frac{2\pi}{p}$$

radians and connected together by the current access points of the electric current to the semi-phases now opposite, where n is the mathematical constant pi and p is the number of poles (p).

8. The magnetic plural pole (2p) axial-flow electric motor according to claim 6 wherein the conductive tracks constituting the phases are assembled in star, and points of return are used for injecting electric current into the stator.

9. The magnetic plural pole (2p) axial-flow electric motor according to claim 1 wherein two of the current access points of the electric current to the conductive tracks of a semi-phase of a pair of conductor layers of the stator are offset relative to each other by rotation angle of $$\frac{2\pi}{p}$$

radians, each current access point of the electric current being associated with an end of said semi-phase, where n is the mathematical constant pi and p is the number of poles (p).

10. The magnetic plural pole (2p) axial-flow electric motor according to claim 9 wherein the pairs of conductor layers of the stator are stacked on each other after rotation by 0 or $$\frac{2\pi}{p}$$

radians and connected together by the current access points of the electric current to the semi-phases now opposite, where n is the mathematical constant pi and p is the number of poles (p).

11. The magnetic plural pole (2p) axial-flow electric motor according to claim 9 wherein the conductive tracks constituting the phases are assembled in star, and the points of return are used for injecting electric current into the stator.

12. The magnetic plural pole (2p) axial-flow electric motor according to claim 1, wherein,
each semi-phase comprises two sets of conductive tracks; and
each set of conductive tracks being arranged in a radial configuration between the internal edge of the stator and an external edge of the stator, such that the electric current of a set of conductive tracks of a semi-phase flows from the internal edge of the stator towards the external edge of the stator and the electric current of the other set of conductive tracks of said semi-phase flows from the external edge of the stator towards the internal edge of the stator.

13. The magnetic plural pole (2p) axial-flow electric motor according to claim 12 wherein the two semi-phases of the same phase and of the same pair of conductor layers of the stator are offset relative to each other by rotation angle of $$\frac{\pi}{p}$$

radians, where n is the mathematical constant pi and p is the number of poles (p).

14. The magnetic plural pole (2p) axial-flow electric motor according to claim 12 wherein one of the sets of conductive tracks of a semi-phase is a printed layer located on a layer of a pair of conductor layers and the other set of conductive tracks of said semi-phase is another printed layer located on the other layer of said pair of conductor layers.

15. The magnetic plural pole (2p) axial-flow electric motor according to claim 14 wherein the two sets of conductive tracks of each semi-phase are interconnected by the intrinsic connections, the intrinsic connections being arranged near the internal and external edges of the stator.

* * * * *